United States Patent
Chiang

(10) Patent No.: US 8,082,626 B2
(45) Date of Patent: Dec. 27, 2011

(54) HINGE FOR ANCHORING AND AUTOMATIC CLOSING

(75) Inventor: Yung-Chang Chiang, Xizhi (TW)

(73) Assignee: Sinher Technology Inc., Xizhi, Taipei County (TW)

( * ) Notice: Subject to any disclaimer, the term of this patent is extended or adjusted under 35 U.S.C. 154(b) by 341 days.

(21) Appl. No.: 12/471,415

(22) Filed: May 25, 2009

(65) Prior Publication Data

US 2010/0293750 A1 Nov. 25, 2010

(51) Int. Cl.
 *E05F 1/08* (2006.01)

(52) U.S. Cl. ............... 16/297; 16/303; 16/330; 16/340

(58) Field of Classification Search ............ 16/327–332, 16/334, 340–342, 303, 297, 374, 386, 387, 16/308; 455/575.3; 379/433.13; 361/679.27; 348/333.06
See application file for complete search history.

(56) References Cited

U.S. PATENT DOCUMENTS

| | | | |
|---|---|---|---|
| 7,222,396 B2 * | 5/2007 | Lu et al. | 16/340 |
| 7,251,129 B2 * | 7/2007 | Lee et al. | 361/679.55 |
| 7,533,446 B1 * | 5/2009 | Lin | 16/330 |
| 7,603,747 B2 * | 10/2009 | Ho et al. | 16/330 |
| 7,784,154 B2 * | 8/2010 | Chen | 16/342 |
| 2006/0185126 A1 * | 8/2006 | Su | 16/340 |
| 2009/0178242 A1 * | 7/2009 | Lin | 16/341 |
| 2009/0320243 A1 * | 12/2009 | Wang et al. | 16/303 |
| 2009/0320245 A1 * | 12/2009 | Wang et al. | 16/374 |
| 2010/0024166 A1 * | 2/2010 | Wang | 16/321 |
| 2010/0101053 A1 * | 4/2010 | Li et al. | 16/341 |
| 2010/0107369 A1 * | 5/2010 | Li et al. | 16/374 |
| 2010/0125973 A1 * | 5/2010 | Wang et al. | 16/303 |
| 2010/0293751 A1 * | 11/2010 | Chiang | 16/297 |
| 2010/0299875 A1 * | 12/2010 | Shen | 16/297 |

FOREIGN PATENT DOCUMENTS

| | | |
|---|---|---|
| TW | 411069 | 11/2000 |
| TW | 506549 | 10/2002 |

* cited by examiner

*Primary Examiner* — William L. Miller
(74) *Attorney, Agent, or Firm* — Muncy, Geissler, Olds & Lowe, PLLC

(57) ABSTRACT

A hinge provides swiveling of a display relative to one side of a host body including a first fastening seat, a pintle, a second fastening seat, a main torsion anchor member, a torsion rotary member, an ancillary torsion anchor member, a compressed elastic reed assembly and a nut. The main torsion anchor member and the torsion rotary member are compressed by a returning force of the compressed elastic reed assembly. When the pintle pivots to a selected angle, the protrusion rapidly slides in a retaining latch trough of the main torsion anchor member through a steep sloped surface so that the display automatically and fully folds over the host body. The torsion rotary member pivots concurrently so that the bulged edge slides on a gradual sloped surface of different gradients so that adequate friction resistance is generated due to compression of the returning force of the compressed elastic reed assembly.

20 Claims, 6 Drawing Sheets

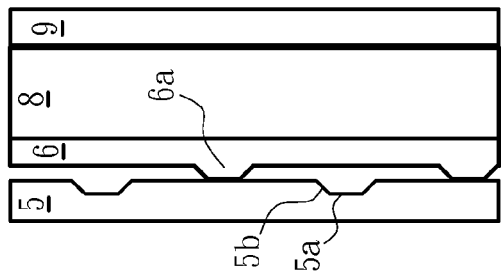
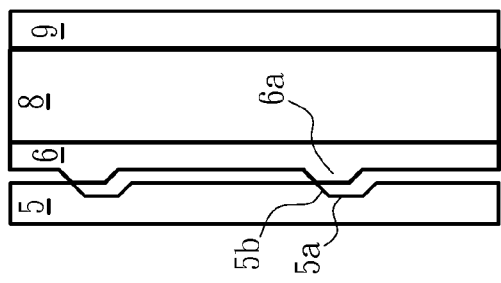
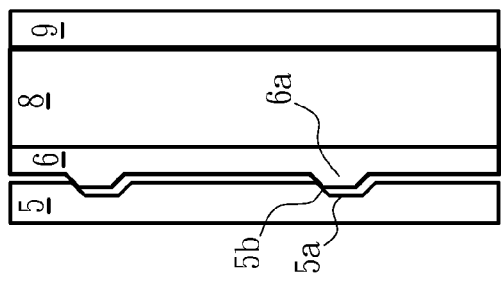
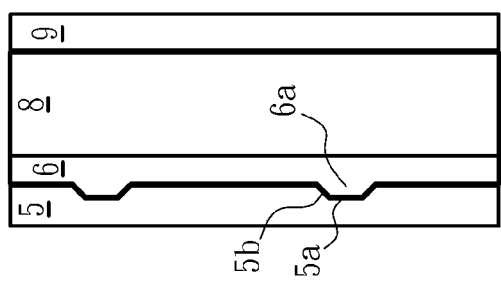
Fig. 1A PRIOR ART
Fig. 1B PRIOR ART
Fig. 1C PRIOR ART
Fig. 1D PRIOR ART
Fig. 1E PRIOR ART
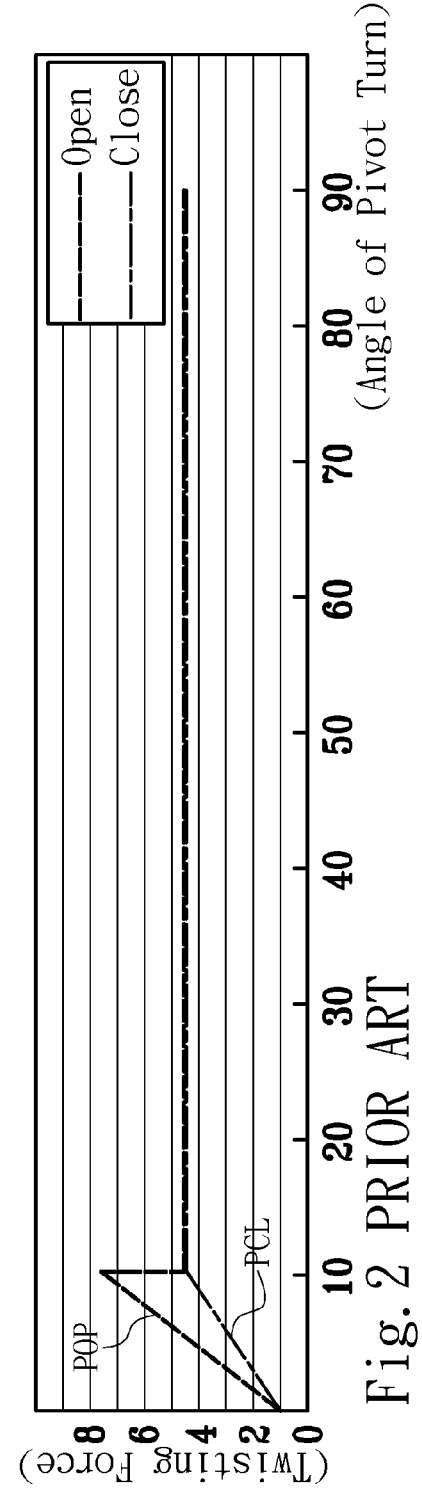
Fig. 2 PRIOR ART

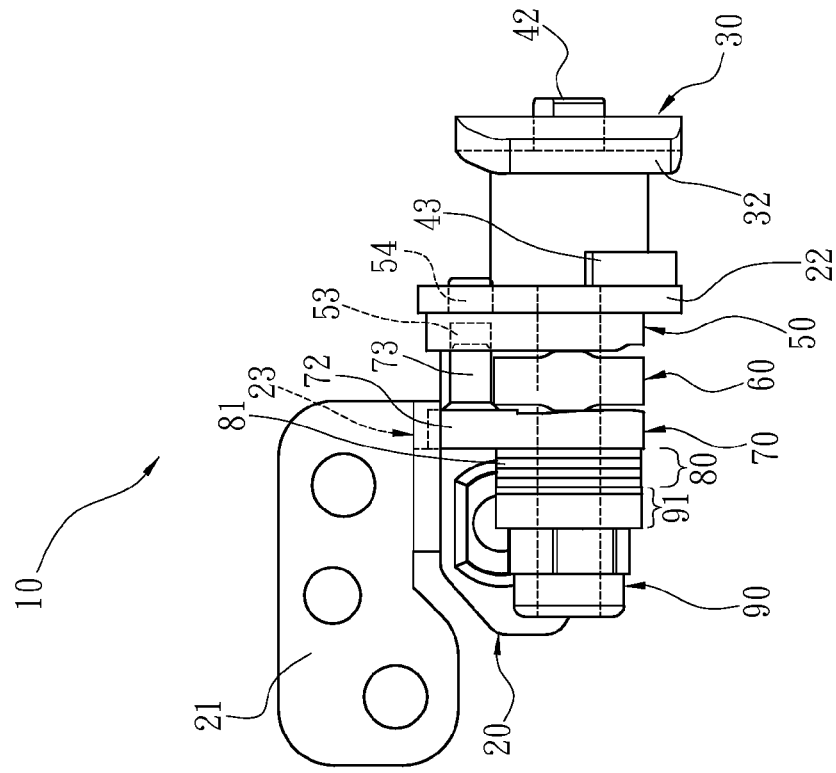
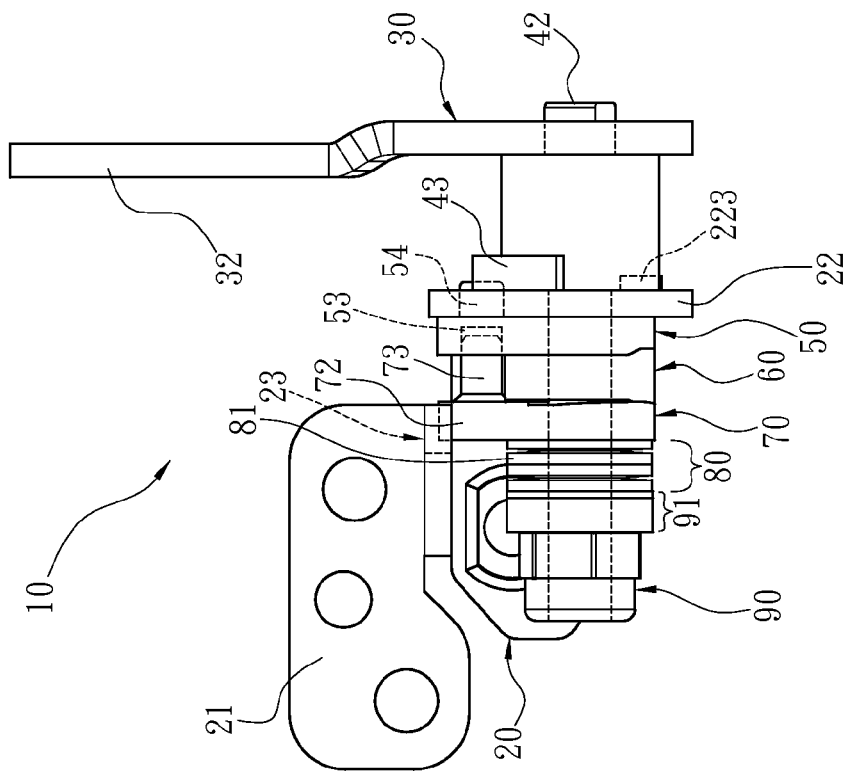

HINGE FOR ANCHORING AND AUTOMATIC CLOSING

FIELD OF THE INVENTION

The present invention relates to a hinge for electronic products and particularly to a hinge used on notebook computers, personal digital assistants (PDAs), digital cameras, mobile phones or the like to form relative swiveling between a display and a host body.

BACKGROUND OF THE INVENTION

Conventional electronic products that have a display such as notebook computers, PDAs, digital cameras, mobile phones and the like generally have a hinge to axially couple the display and a host body on two opposite sides thereof. When in use, the display is unfolded relative to the host body. When not in use, the display may be folded over the host body in a closed manner to make stowing and carrying easier.

To fully close the display and the host body after folded, a hook usually is provided to latch the display. For instance, R.O.C. patent No. 506549 discloses an inclined hinge with a torque difference. The hinge has an installation element installed on a metal portion of one side of the body with a metal bearing bent vertically, a swivel portion installed on one side of an opening/closing body and having an installation portion, a larger diameter portion and a deformed smaller diameter portion that are mounted onto the metal bearing so that a pintle can be pivoted about a bearing hole. The pintle is held in a hole formed in the center between the greater diameter portion and one side of the metal bearing. A first friction pad is provided to pivot concurrently with the pintle or stop the metal bearing with a central aperture inserted by the deformed smaller diameter portion. There is a second friction pad fastened to the metal bearing or pivoted concurrently with the pintle. A deformed insert hole is formed in the center of the contact location between the first and second friction pads to hold the deformed smaller diameter portion. One or more than one compression spring washers, discs or undulate blades are provided to form an elastic means. The connection is made when the deformed smaller diameter portion is inserted into a hole formed in the center of the elastic means. A depressing pad is provided to pivot concurrently with the pintle, and driven by the deformed smaller diameter portion, and the pintle has a protrusive side. The metal bearing can generate different friction torques axially on any side due to the pivoting angle of the pintle.

However, during swiveling displacement for closing, it does not provide a hinge of automatic and closed folding of the display over the host body while the pintle is pivoted to a selected angle. It still has drawbacks. To remedy the aforesaid disadvantage, R.O.C. patent No. 411069 entitled "Hinge" provides an adjustment structure with a turning displacement formed between a joined surface of a rotary member and an anchor member. At one selected spot, the rotary member and the anchor member can be latched to form a stageless anchoring and closing without opening or closing the display. By adding a resistance generation structure equipped with a resistance element and a washer, the mutual friction resistance between them also can increase. Hence it provides a steadier stageless anchoring and closing even with a hinge of a smaller diameter. While the R.O.C. patent No. 411069 can provide automatic closing, it still leaves a lot to be desired. More details of its deficiencies are elaborated as follow by referring to FIGS. 1A through 1E and FIG. 2.

FIG. 1A is a fragmentary schematic view of R.O.C. patent No. 411069 and the twisting force curves while it is in consecutive actions. It includes an anchor member 5, a rotary member 6, a resistance generation structure 9 and a returning element 8 interposed between the rotary member 6 and the resistance generation structure 9. The positional relationship of the anchor member 5, rotary member 6, returning element 8 and resistance generation structure 9 shown in FIG. 1A represents a condition of the display fully folded over the host body (not shown in the drawings). Referring to FIG. 2, a conventional opening curve (POP) and closing curve (PCL) start at a spot where the display is fully folded over the host body, the pintle pivots at an angle of 0.degree, and the rotary member 6 is elastically pressed by the returning element 8 and slides automatically in a retaining trough 5a of the anchor member 5 so that a twisting force (or an internal stress, with the twisting force at a scale about 1) is formed on the hinge. When the display is unfolded to form an angle of 5.degrees with the host body (i.e. the pintle pivots to 5.degrees), referring to FIG. 1B, a bulged portion 6a slides out through a sloped surface 5b of the retaining trough 5a, and the retaining trough 5a slides to compress the returning element 8, as a result the twisting force increases rapidly as shown in FIG. 2 by the conventional POP at the angle of 5.degrees. As shown in the drawings, the conventional POP is steep; hence unfolding the display requires a greater force. It means a heavy opening. When the display is opened to form an angle just over 10.degrees with the host body (i.e. the pintle pivots just over 10.degrees), referring to FIG. 1C, the bulged portion 6a has fully slid out of the sloped surface 5b of the retaining trough 5a, and compresses the returning element 8 and passes over a threshold point, as a result a maximum twisting force is formed on the returning element 8 caused by the maximum compression of the bulged portion 6a, then drops drastically as shown in FIG. 2 by the conventional POP at the angle over 10.degrees. Thus during unfolding of the display, the maximum twisting force (at a scale about 8) of the conventional POP of the hinge is quite significant, namely for the conventional display equipped with the automatic closing hinge, unfolding the display needs a greater force. This is the main drawback of the R.O.C. patent No. 411069. As a result, unfolding the display from the host body often requires a user prying with two hands. Otherwise the host body tends to be dragged to the display during the unfolding process. However, after the display has been unfolded to form an angle over 10.degrees with the host body (i.e. the pintle has pivoted over 10.degrees), referring to FIGS. 1D and 1E, the bulged portion 6a has already escaped the sloped surface 5b without continuously compressing the returning element 8, and slides to form a steady twisting force (at a scale about 4.5) as shown in FIG. 2, indicated by the conventional POP. On the other hand, when the display is closed to form an angle with the host body just over 10.degrees (i.e. the pintle pivots just over 10.degrees), referring to FIG. 1C, the bulged portion 6a is compressed by the returning force of the returning element 8, and has just passed over the threshold point and starts to slide into the retaining trough 5a through the sloped surface 5b to return to the position shown in FIG. 1A. Also referring to FIG. 2, then a conventional closing curve (PCL) is formed while the pintle pivots within an angular range between 10.degrees and 0.degree. When the display closes at the selected angle of 10.degrees on the conventional PCL, a steady twisting force (at about a scale of 4.5 against the compressing force of the returning element) is formed to automatically fold the display over the host body to generate a "light closing" result. Consequently, the closed display also receives a smaller depressed force. This is another problem occurred to R.O.C. patent No. 411069.

SUMMARY OF THE INVENTION

The primary object of the present invention is to provide a hinge that allows a display to automatically and fully fold over a host body when the hinge is swiveled to a pre-set angle during closing stroke of the display and also provide adequate friction resistance to achieve a "light opening and heavy closing" and stageless anchoring effect while the display is unfolded and the pintle turns within an angular range of ninety degrees.

To achieve the foregoing object, the present invention provides a hinge for anchoring and automatic closing to allow a display to swivel relative to one side of a host body. The hinge according to the invention includes a first fastening seat which has an extended installation end fastened to the host body and an axle support portion. The axle support portion has an axle hole. The first fastening seat also has an anchor notch. The hinge also has a pintle which has a shaft running through the axle hole and a fastening pin, a second fastening seat which has a pin hole to receive the fastening pin and a coupling end fastened to the display, a torsion rotary member which is fixedly coupled on the pintle and has a protrusion on one surface end and a bulged edge on other surface end, a main torsion anchor member which is axially coupled on the pintle and located at one side of the torsion rotary member and fastened to the first fastening seat and has a retaining latch trough latchable with the protrusion and a steep sloped surface allowing the protrusion to slide in or out of the retaining latch trough, an ancillary torsion anchor member which is axially coupled on the pintle and located at another side of the torsion rotary member and slidable axially to couple with the first fastening seat or the main torsion anchor member and the ancillary torsion anchor member has a gradual sloped surface to allow the bulged edge to slide up or down, a compressed elastic reed assembly which is axially coupled on the pintle and includes a plurality of arched washers to provide a friction force required by swiveling of the main torsion anchor member and the ancillary torsion anchor member, and a nut is fastened to a distal end of the shaft of the pintle.

By means of the structure set forth above, the main torsion anchor member and the torsion rotary member are compressed by a returning force of the compressed elastic reed assembly. When the pintle pivots to a selected angle, the protrusion of the torsion rotary member rapidly slides through the steep sloped surface into the retaining latch trough of the main torsion anchor member, and the display automatically and fully folds over the host body in a closed manner. The torsion rotary member also is pivoted concurrently so that the bulged edge slides on the gradual sloped surface of the ancillary torsion anchor member of different gradients, and also is compressed by the returning force of the compressed elastic reed assembly. Thus an adequate friction resistance is generated to form light opening and heavy closing and stageless anchoring effect for the display during unfolding and the pintle pivoting within the angular range of ninety degrees.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 1A through 1E are fragmentary schematic views of a conventional hinge in consecutive unfolding conditions.

FIG. 2 is a chart showing torsion curves according to FIGS. 1A through 1E.

FIG. 4A is a plane top view according to FIG. 3.

FIG. 4B is a schematic view of swiveling operation according to FIG. 4A.

DETAILED DESCRIPTION OF THE PREFERRED EMBODIMENT

Figure 3:
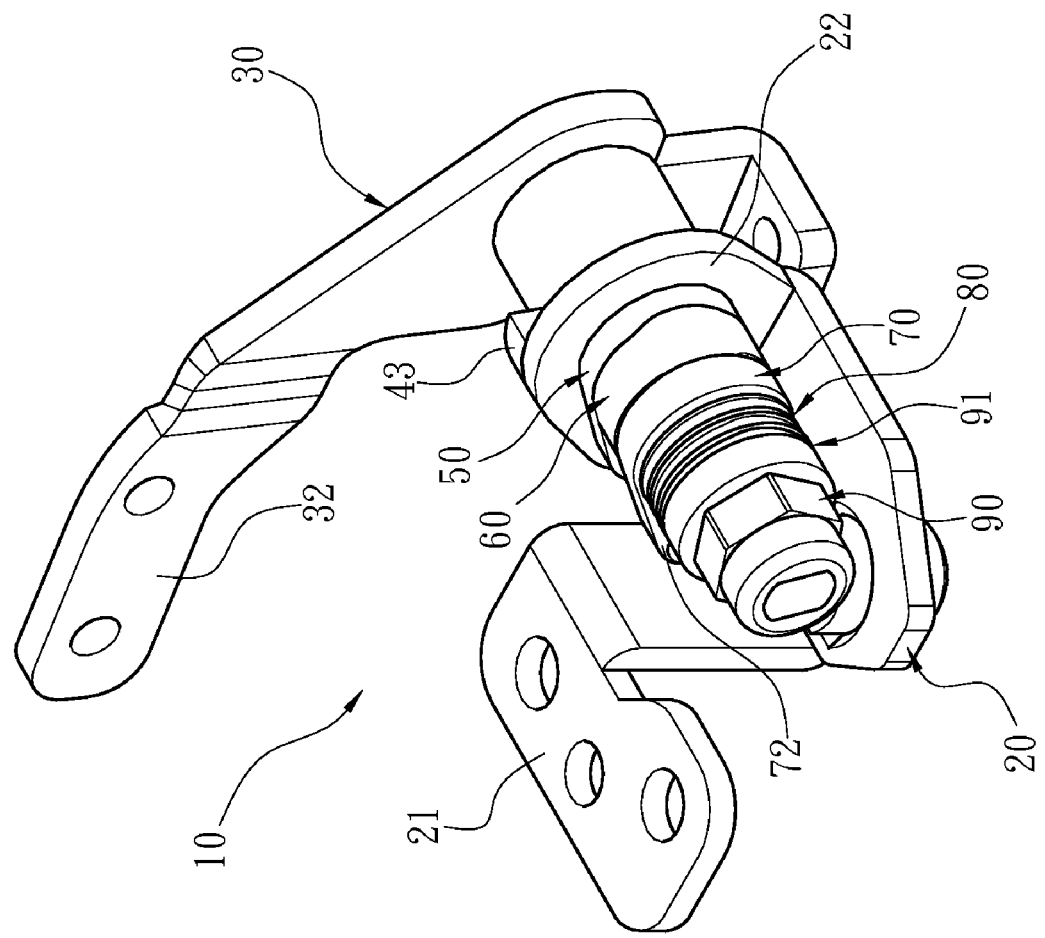
FIG. 3 is a perspective view of the hinge of the invention.
Figure 5:
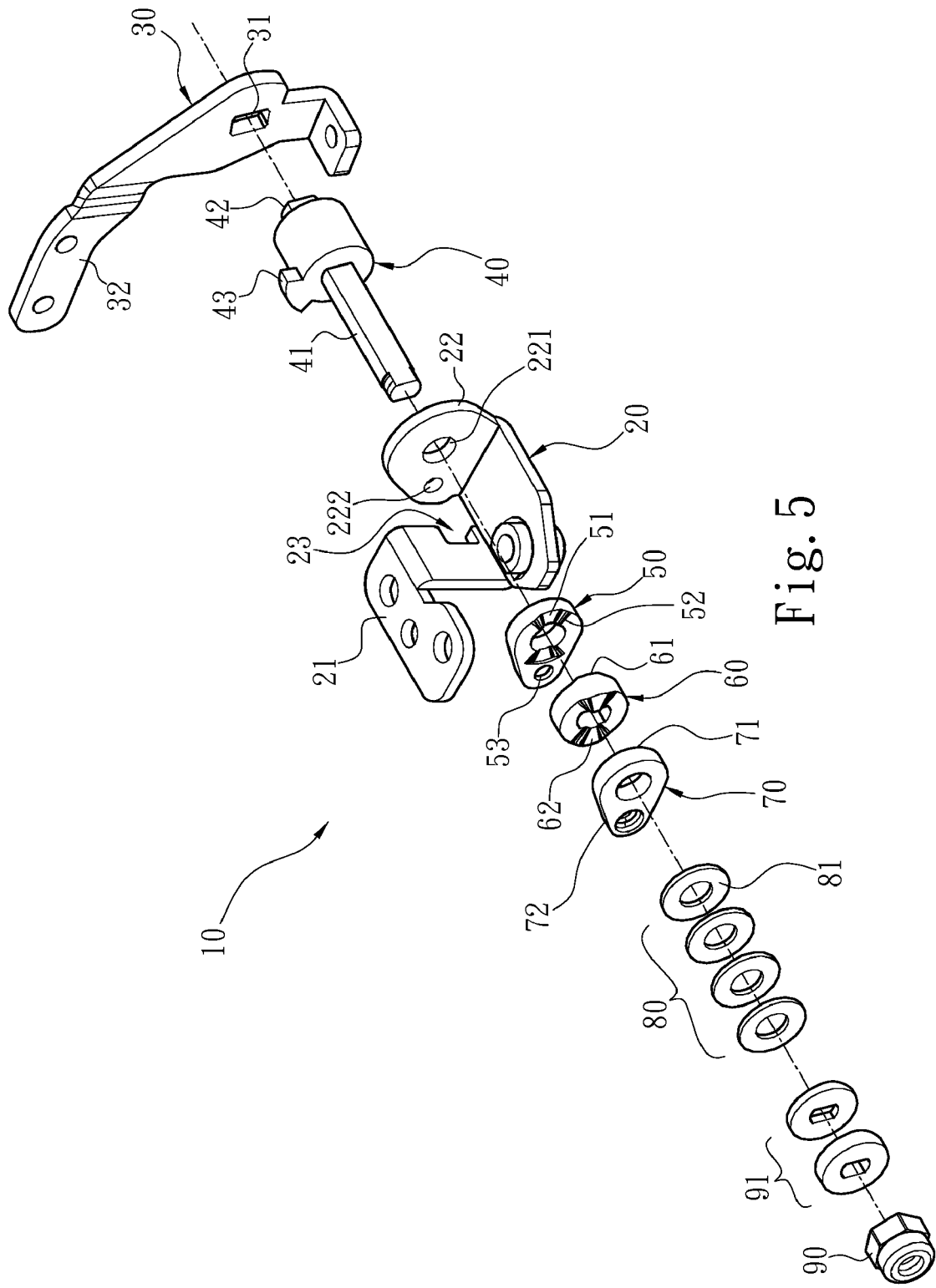
FIG. 5 is an exploded view according to FIG. 3.
Figure 6:
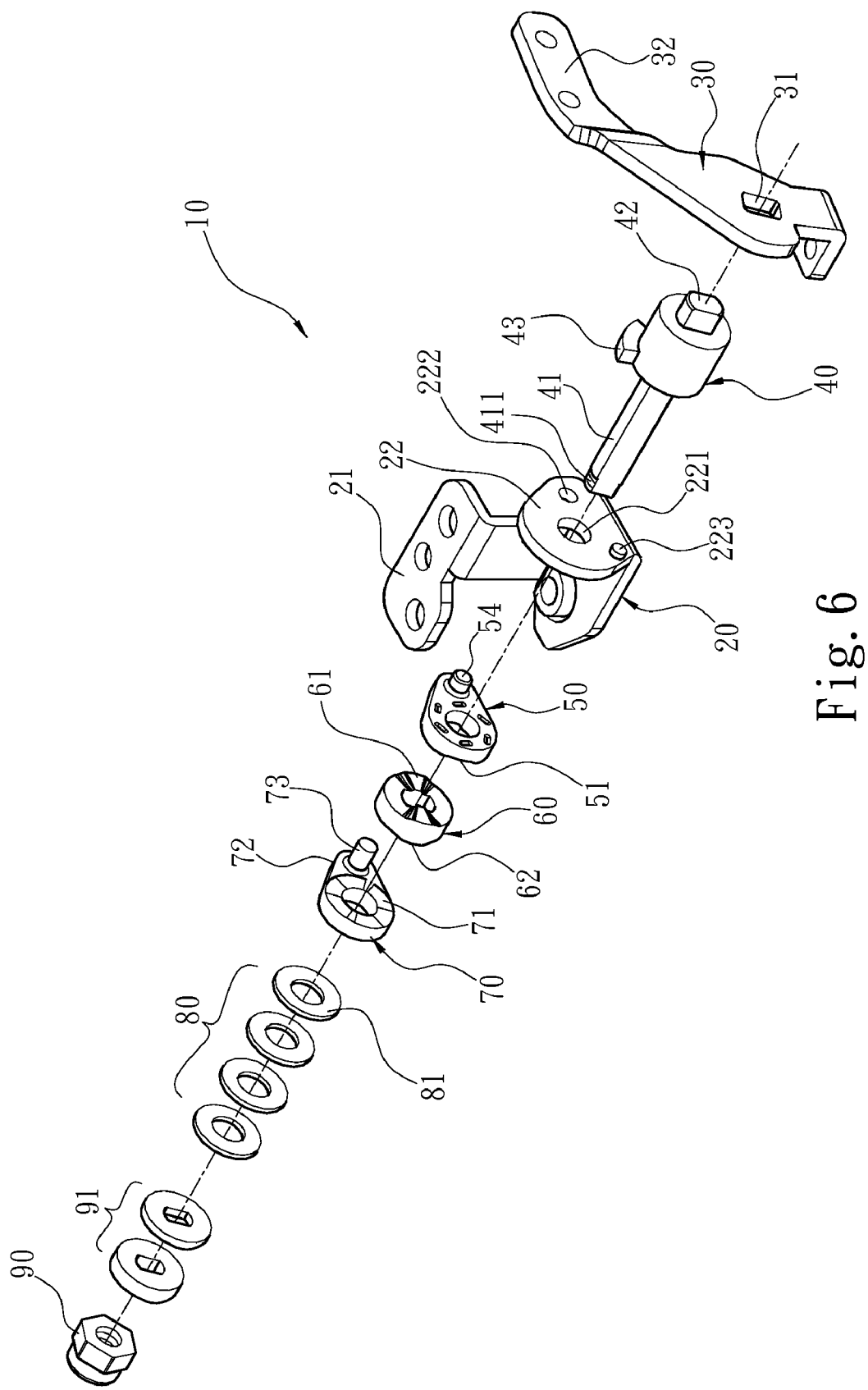
FIG. 6 is an exploded view based on another viewing angle according to FIG. 3.

Please refer to FIGS. 3 through 6, the hinge 10 according to the invention aims to form swiveling of a display relative to one side of a host body (their structural relationship and operational principle are known to one skilled in the art, thus the details are omitted in the drawings). The hinge 10 includes a first fastening seat 20 which has an extended installation end 21 fastened to the host body and an axle support portion 22. The axle support portion 22 has an axle hole 221. The first fastening seat 20 further has an anchor notch 23. The axle support portion 22 has an anchor stud 223. The hinge also has a pintle 40 which has a shaft 41 running through the axle hole 221 and a fastening pin 42. The pintle 40 also has a jutting angular anchor lug 43. When the pintle 40 pivots, the angular anchor lug 43 hits the anchor stud 223 or an anchor pin 54 so that its pivoting stroke is restricted. The shaft 41 of the pintle 40 further has a distal end with a threaded portion 411 formed thereon. The hinge further has a second fastening seat 30 which has a pin hole 31 wedged by the fastening pin 42 and a coupling end 32 fastened to the display, a torsion rotary member 60 which is fixedly fastened to the pintle 40 and has a protrusion 61 on one surface end and a bulged edge 62 on other surface end, a main torsion anchor member 50 which is axially coupled on the pintle 40 and located at one side of the torsion rotary member 60 and fastened to the first fastening seat 20, and has a retaining latch trough 51 latchable with the protrusion 61 and a steep sloped surface 52 slidable by the protrusion 61 in or out of the retaining latch trough 51 and also has an anchor cavity 53. An ancillary torsion anchor member 70 which is axially coupled to the pintle 40 and located at another side of the torsion rotary member 60 and slidable axially to couple with the first fastening seat 20 or the main torsion anchor member 50. Namely the ancillary torsion anchor member 70 has an anchor end 72 slidable axially to couple with the anchor notch 23 and a sliding pin 73 slidable axially to couple with the anchor cavity 53, and a gradual sloped surface 71 slidable by the bulged edge 62 up or down. The hinge further has a compressed elastic reed assembly 80 which is axially coupled on the pintle 40 and has a plurality of arched washers 81 to provide a friction force required by swiveling of the torsion rotary member 60 against the main torsion anchor member 50 and the ancillary torsion anchor member 70. The arched washers 81 have at least two arched surfaces facing each other, and preferably four pieces divided into two pairs each with two arched surfaces facing each other. The hinge also has a nut 90 fastened to the threaded portion 411 of the pintle 40. Finally, at least one friction washer 91 is provided and fixedly coupled on the pintle 40 adjoining to the nut 90 to increase friction force when the pintle 40 pivots to achieve desired stageless anchoring effect.

By means of the construction set forth above, the main torsion anchor member 50 and the torsion rotary member 60 are compressed by a returning force of the compressed elastic reed assembly 80. When the pintle 40 pivots to a selected angle, the protrusion 61 of the torsion rotary member 60 rapidly slides through the steep sloped surface 52 into the retaining latch trough 51 of the main torsion anchor member 50 so that the display automatically and fully folds over the host body. The torsion rotary member 60 pivots concurrently so that the bulged edge 62 slides on the gradual sloped surface 71 of different gradients of the ancillary torsion anchor member 70, and also is compressed by the returning force of the compressed elastic reed assembly 80. Thus adequate friction resistance is generated. Therefore, when the display is unfolded and the pintle 40 pivots within an angle of ninety degrees, a light opening and heavy closing and stageless anchoring effect can be accomplished.

Figures 7A, 7B, 7C, 7D, 7E:
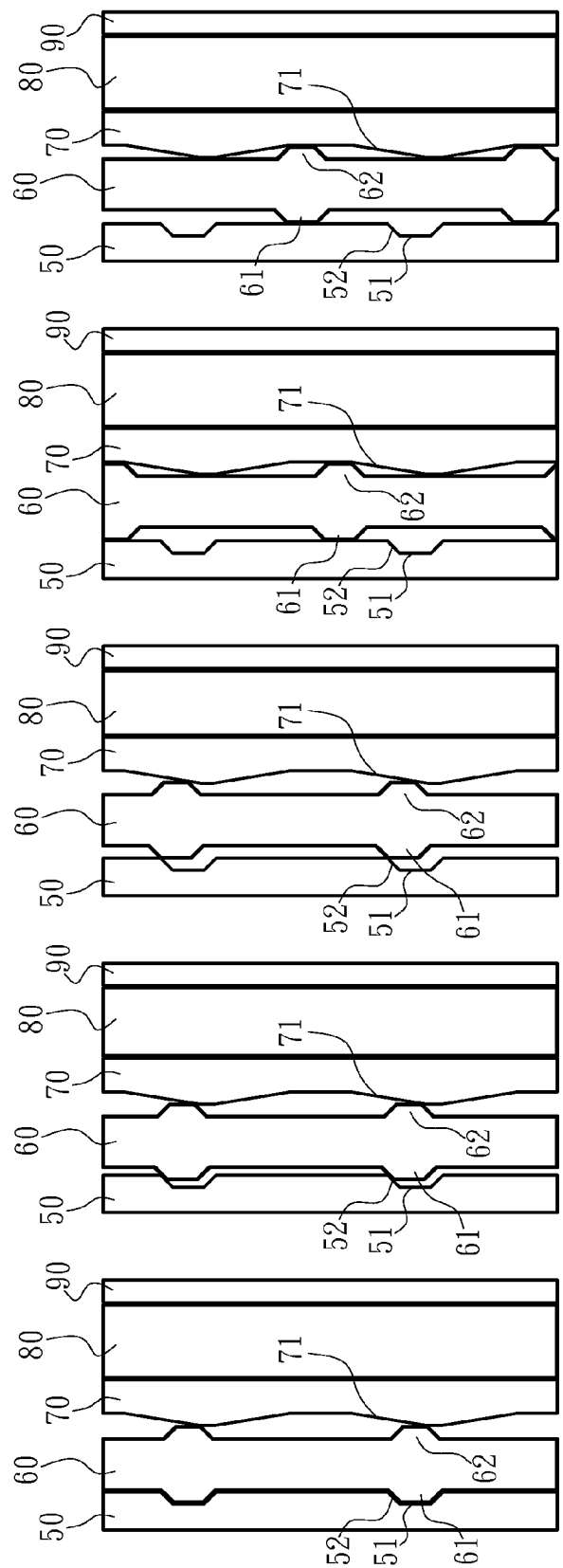
FIGS. 7A through 7E are fragmentary schematic views of the hinge of the invention in consecutive unfolding conditions.
Figure 8:
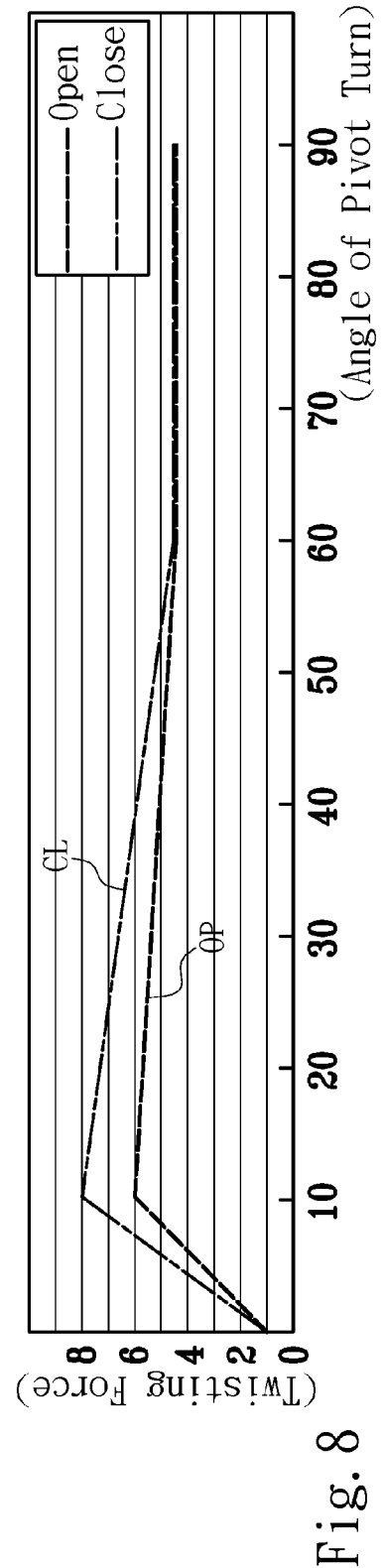
FIG. 8 is a chart showing torsion curves according to FIGS. 7A through 7E.

Refer to FIGS. 4A and 4B, and 7A through 7E for the fragmentary consecutive actions of the hinge and FIG. 8 for the corresponding torsion curves. FIG. 7A illustrates the main torsion anchor member 50 and the retaining latch trough 51 and steep sloped surface 52 formed thereon, and the torsion rotary member 60 and the protrusion 61 and bulged edge 62 formed thereon, and the ancillary torsion anchor member 70 and the gradual sloped surface 71 formed thereon, and the nut 90 and the compressed elastic reed assembly 80 interposed between the ancillary torsion anchor member 70 and nut 90. Their relative positions as shown in FIG. 7A equally represent the fully folding condition of the display over the host body (not shown in the drawings). Also referring to FIG. 8, in the fully folding condition, the opening curve OP and the closing curve CL start at the pivoting angle of 0.degree of the pintle 40, and the hinge 10 has a torsion (or internal stress, at a scale about 1) resulting from compression of the elastic force of the compressed elastic reed assembly 80 applied to the ancillary torsion member 70 and the protrusion 61 of the torsion rotary member 60 that automatically slid into the retaining latch trough 51 of the main torsion anchor member 50. When the display is unfolded to form an angle of 5.degrees with the host body (i.e. the pintle 40 pivots to the angle of 5.degrees), referring to FIG. 7B, the protrusion 61 slides out from the retaining latch trough 51 through the steep sloped surface 52, meanwhile the bulged edge 62 slides concurrently on the gradual sloped surface 71 in the same direction. As the steep sloped surface 52 has a greater gradient than the gradual sloped surface 71, the protrusion 61 slides out and compresses the compressed elastic reed assembly 80 at a greater distance than the smaller release distance caused by the sliding of the bulged edge 62. The gradually increased torsion (at a scale about 3.5) is formed by the compression of the compressed elastic reed assembly 80 which generated more rapidly by the protrusion 61 and more slowly by the bulged edge 62 as shown by the opening curve OP at an angle of 5.degrees in FIG. 8. Compared with the conventional POP shown in FIG. 2, the torsion generated by the hinge 10 of the invention on the opening curve OP is much smaller than the conventional one, thus a "light opening" and "stageless anchoring" effect can be accomplished for the display during unfolding. When the display is unfolded to form an angle just over 10.degrees with the host body (i.e. the pintle 40 pivots an angle just over 10.degrees), referring to FIG. 7C, the protrusion 61 fully slides out of the steep sloped surface 52 in the retaining latch trough 51, but the bulged edge 62 still is sliding on the gradual sloped surface 71. As the protrusion 61 just passes over the threshold point to form a maximum compression of the compressed elastic reed assembly 80 while the bulged edge 62 is still slowly preceding release of the compressed elastic reed assembly 80, the torsion of the hinge 10 is gradually decreased. As shown by the opening curve OP at the angle over 10.degrees in FIG. 8, during the unfolding process of the display, the hinge 10 generates a maximum torsion (at a scale about 6) much smaller than the conventional one (at a scale about 8 as shown in conventional POP in FIG. 2). Thus it proves that the invention can provide the "light opening" and "stageless anchoring" effect while the display is unfolded. When the display is continuously unfolded to form an angle just over 60.degrees with the host body (i.e. the pintle 40 pivots just over 60.degrees), referring to FIG. 7D, the protrusion 61 has escaped the steep sloped surface 52 and slides without compressing the compressed elastic reed assembly 80, meanwhile the bulged edge 62 just finishes sliding on the gradual sloped surface 71 and passes over another threshold point so that the slow release of the compressed elastic reed assembly 80 also is finished and a steady torsion is formed (at a scale about 4.5). As shown by the opening curve OP in FIG. 8 with the angle just exceeding 60.degrees, the display is unfolded at an angle just over 60.degrees, the hinge 10 generates a steady torsion (shown by the opening curve OP) same as the conventional one (shown by conventional POP in FIG. 2) until the pintle 40 pivots to the angle shown in FIG. 7E.

On the other hand, when the display is folded in the opposite direction at an angle just over 60.degrees with the host body (i.e. the pintle 40 pivots just over 60.degrees), referring to FIG. 7D, the protrusion 61 remains at a location away from the steep sloped surface 52 and slides without increasing or decreasing compression of the compressed elastic reed assembly 80, meanwhile the bulged edge 62 just passes over the threshold point and slides on the gradual sloped surface 71 so that a slow compression is formed to slowly increase the torsion. As shown by the closing curve CL in FIG. 8 at an angle just over 60.degrees, when the display is folded at an angle just over 60.degrees, the slowly increasing torsion of the closing curve CL of the hinge 10 is greater than the opening curve OP at the same angular range, and also is greater than the steady torsion of the conventional closing curve PCL (as shown in FIG. 2), thus a "heavy closing" and "stageless anchoring" effect can be achieved during folding of the display. When the display is folded at an angle just over 10.degrees with the host body (i.e. the pintle 40 pivots just over 10.degrees), referring to FIG. 7C, the protrusion 61, due to compression of the compressed elastic reed assembly 80, starts entering the steep sloped surface 52 of the retaining latch trough 51 and passes over the threshold point to slide on the steep sloped surface 52, meanwhile even though the bulged edge 62 is still sliding on the gradual sloped surface 71, due to the protrusion 61 slides quickly in the retaining latch trough 51 through the steep sloped surface 52 under the returning force of the compressed elastic reed assembly 80 and the compression force of the compressed elastic reed assembly 80 is released rapidly, thus it rapidly returns to the position as shown in FIG. 7A. Referring to FIG. 8, the closing curve CL of the pintle 40 in the angular range between 10.degrees and 0.degree is much steeper than the conventional closing curve PCL (as shown in FIG. 2), thus a greater torsion is formed (at a scale about 8, compared with the compression force of the compressed elastic reed assembly 80). As a result, the display can be folded over the host body quicker and securer than the conventional one. In short, adopted the invention, the display can automatically and fully fold over the host body to form a closed condition when the display is folded to a selected angle (such as 10.degrees discussed in the previously example).

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A hinge for anchoring and automatic closing to provide swiveling of a display relative to one side of a host body, comprising:
   a first fastening seat which has an extended installation end fastened to the host body, an axle support portion having an axle hole, and the first fastening seat having an anchor notch;
   a pintle which has a shaft running through the axle hole and a fastening pin;
   a second fastening seat which has a pin hole receiving the fastening pin and a coupling end fastened to the display;
   a torsion rotary member which is fixedly coupled on the pintle and has a protrusion on one surface end and a bulged edge on other surface end;
   a main torsion anchor member which is axially coupled on the pintle at one side of the torsion rotary member and fixedly fastened to the first fastening seat, and has a retaining latch trough latchable with the protrusion and a steep sloped surface slidable upon the protrusion;
   an ancillary torsion anchor member which is axially coupled on the pintle at another side of the torsion rotary member and slidable axially to couple with the first fastening seat and the main torsion anchor member, and has a gradual sloped surface slidable upon the bulged edge;
   a compressed elastic reed assembly which is axially coupled on the pintle and includes a plurality of arched washers to provide a friction force required by swiveling of the torsion rotary member against the main torsion anchor member and the ancillary torsion anchor member; and
   a nut fastened to a distal end of the shaft of the pintle;
   wherein the main torsion anchor member and the torsion rotary member are compressed by a returning force of the compressed elastic reed assembly and the protrusion rapidly slides through the steep sloped surface in the retaining latch trough when the pintle pivots to a selected angle so that the display automatically and fully folds over the host body; the torsion rotary member pivoting concurrently so that the bulged edge slides on the gradual sloped surface of different gradients of the ancillary torsion anchor member and is compressed by the returning force of the compressed elastic reed assembly, thereby adequate friction resistance is generated such that the display performs a light opening, heavy closing, and stageless effect during unfolding while the pintle pivots within an angle of ninety degrees.

2. The hinge of claim 1 further having at least one friction washer adjoining to the nut and fixedly coupled on the pintle.

3. The hinge of claim 2, wherein the arched washers of the compressed elastic reed assembly have at least two arched surfaces facing each other.

4. The hinge of claim 3, wherein the plurality of arched washers include four washers.

5. The hinge of claim 3, wherein the main torsion anchor member has an anchor pin.

6. The hinge of claim 5, wherein the axle support portion of the first fastening seat has an anchor hole receiving the anchor pin.

7. The hinge of claim 6, wherein the axle support portion has an anchor stud.

8. The hinge of claim 7, wherein the pintle has a jutting angular anchor lug to hit the anchor stud or the anchor pin to limit pivoting of the pintle.

9. The hinge of claim 8, wherein the shaft of the pintle has a distal end which has a threaded portion formed thereon.

10. The hinge of claim 9, wherein the nut is screwed with the threaded portion of the pintle.

11. The hinge of claim 10, wherein the main torsion anchor member has an anchor cavity.

12. The hinge of claim 11, wherein the ancillary torsion anchor member has a sliding pin slidable axially coupled to the anchor cavity.

13. The hinge of claim 2, wherein the main torsion anchor member has an anchor pin.

14. The hinge of claim 13, wherein the axle support portion of the first fastening seat has an anchor hole receiving the anchor pin.

15. The hinge of claim 14, wherein the axle support portion has an anchor stud.

16. The hinge of claim 15, wherein the pintle has a jutting angular anchor lug to hit the anchor stud or the anchor pin to limit pivoting of the pintle.

17. The hinge of claim 2, wherein the shaft of the pintle has a distal end which has a threaded portion formed thereon.

18. The hinge of claim 17, wherein the nut is screwed with the threaded portion of the pintle.

19. The hinge of claim 2, wherein the main torsion anchor member has an anchor cavity.

20. The hinge of claim 19, wherein the ancillary torsion anchor member has a sliding pin slidable axially coupled to the anchor cavity.

* * * * *